United States Patent [19]

Steeley

[11] Patent Number: 4,721,056
[45] Date of Patent: Jan. 26, 1988

[54] VISUAL INDICATOR CAP FOR A TELECOMMUNICATION CABLE TERMINAL PEDESTAL

[76] Inventor: Larry J. Steeley, 2401 Regent Cir., Birmingham, Ala. 35226

[21] Appl. No.: 76,915

[22] Filed: Jul. 23, 1987

[51] Int. Cl.⁴ .......................... G08B 5/00; H02G 9/02
[52] U.S. Cl. .................... 116/209; 150/52 R; 174/38; 174/66; 220/266; 220/306
[58] Field of Search ............ 174/38, 66, 138 F; 150/52 R; 116/200, 209; 220/3.8, 241, 256, 266, 306, 324

[56] References Cited

U.S. PATENT DOCUMENTS

| | | | |
|---|---|---|---|
| 2,329,442 | 9/1943 | Popp | 220/306 X |
| 2,665,353 | 1/1954 | Popp | 220/306 X |
| 2,997,520 | 8/1961 | Kinsman | 220/306 X |
| 3,106,602 | 10/1963 | Hartz | 220/324 X |
| 3,683,314 | 8/1972 | Elkins | 174/138 F X |
| 3,684,817 | 8/1972 | Card, Jr. et al. | 220/306 X |
| 3,926,141 | 12/1975 | Taylor | 116/209 |

FOREIGN PATENT DOCUMENTS

| | | | |
|---|---|---|---|
| 122120 | 1/1972 | Denmark | 220/306 |
| 1515491 | 6/1969 | Fed. Rep. of Germany | 174/66 |
| 97509 | 11/1939 | Sweden | 220/306 |
| 322825 | 12/1929 | United Kingdom | 220/3.8 |
| 1239804 | 7/1971 | United Kingdom | 174/66 |
| 1363423 | 8/1974 | United Kingdom | 174/66 |

OTHER PUBLICATIONS

"REPCO All-Purpose Telephone Closure-Series PP6/35", Repco Products Corporation Brochure, copyright Sep. 1973, 4 pages.

*Primary Examiner*—Laramie E. Askin
*Attorney, Agent, or Firm*—Jennings, Carter, Thompson & Veal

[57] ABSTRACT

A visual indicator plastic cap for a telecommunications terminal pedestal includes a distinctively colored form-fitting cover member having depending sidewalls and latches which engage the watershed lip of the pedestal. A scored removable portion on the cap facilitates removing a portion of the cap material for use with a top access cable. The cap is formulated with ultraviolet absorbers to enhance its color retentiveness, so that it may remain immediately recognizable over an extended period.

5 Claims, 5 Drawing Figures

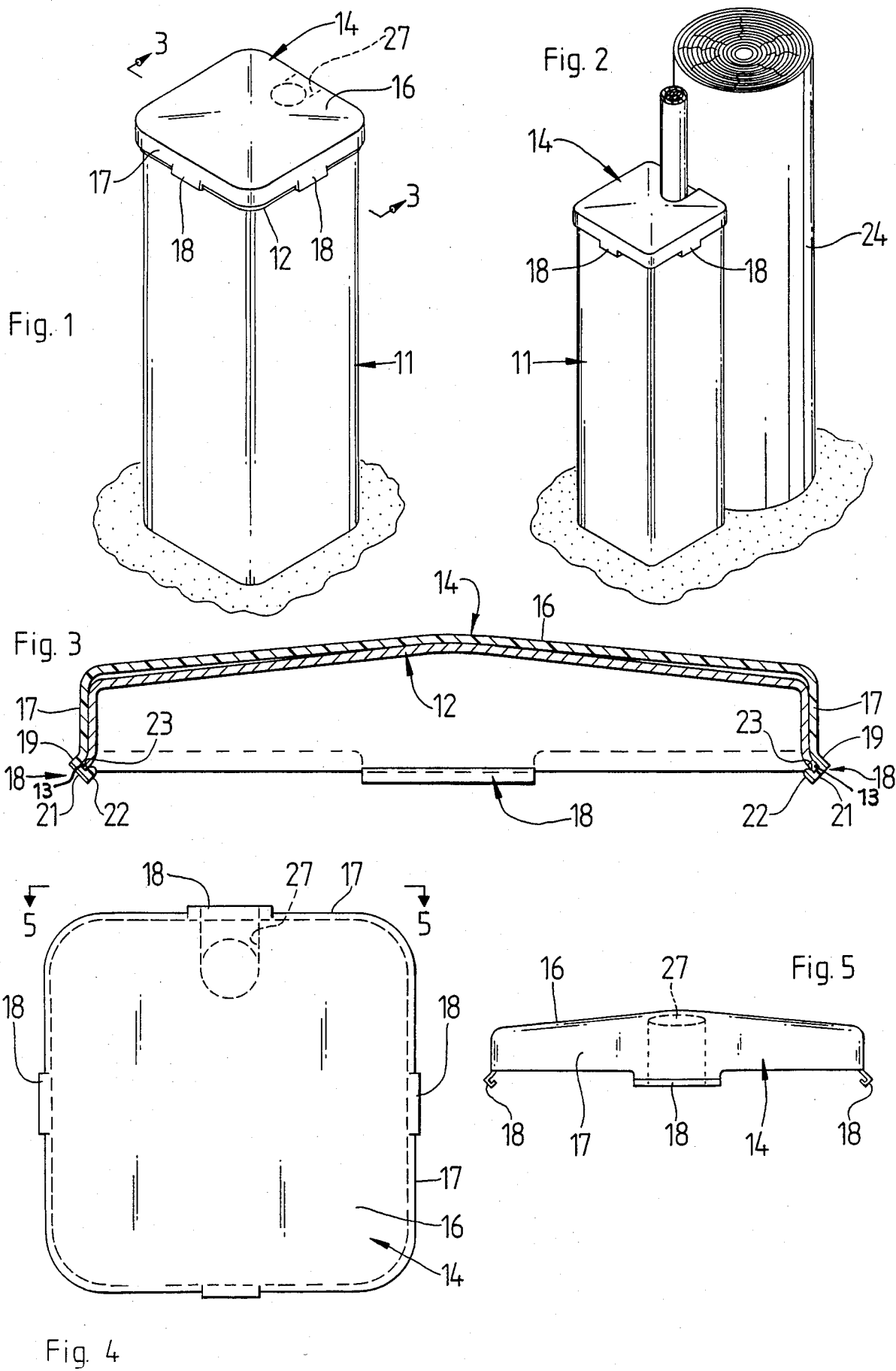

VISUAL INDICATOR CAP FOR A TELECOMMUNICATION CABLE TERMINAL PEDESTAL

FIELD OF THE INVENTION

The present invention relates to the general field of telecommunication lines and in particular relates to telecommunications above-ground cable terminal pedestals. In even greater particularity, the present invention may be described as a dimensional form fitting and readily visible indicator cap for such pedestals.

BACKGROUND OF THE INVENTION

Telecommunications above-ground terminal pedestals are the generally green-colored metallic boxes, measuring 12"×12" by 1' or 2', which are generally seen along highway rights-of-way and adjacent telephone poles or walls or the like. They are normally painted green to blend in with nature's colors about them and are consequently generally unnoticed. In fact, the blending accomplished by these green-colored pedestals has worked too well. Personnel needing access to such terminals for maintenance and repair of the telecommunications systems often have difficulty recognizing and locating the pedestals in heavy growths and vegetations. A greater problem is presented by the fact that the pedestals are frequently unnoticed by maintenance crews using tractor driven power mowers. These mowers destroy the pedestals and sever the telecommunication lines therein, thereby requiring a great expenditure in manpower to re-establish the telecommunications system. Also, the water shedding covers on such pedestals are often damaged such that they do not provide a proper closure over the terminals, thus allowing moisture or foreign objects to enter the pedestal.

SUMMARY OF THE INVENTION

It is an object of the present invention to provide immediate visual recognition of the cable pedestals so that they may be located or avoided.

My visual indicator cap is made from plastic in a bright, easily recognizable color, such as orange, and having a composition including ultraviolet absorbers to prolong the life of the product in the field. Inasmuch as the pedestals are provided with a metal cover, my visual indicator cap is formed to cooperate with this metal cover. That is, my cap has dimensions which conform to the metal cover and sidewalls which extend downwardly about the cover. Each sidewall carries a latch which engages the lower edge of the cover to secure my cap thereto. In some instances, a bundle of cables exits the pedestal through a port in the metal cover. To accommodate such bundle, my cap has a scored removable portion which may be cooperatively positioned adjacent the port so that the bundle may pass therethrough.

BRIEF DESCRIPTION OF THE DRAWINGS

A visual indicator cap embodying features of my invention is depicted in the accompanying drawings, which form a portion of this application and wherein:

FIG. 1 is a perspective view of my visual indicator cap on a pedestal;

FIG. 2 is a perspective view of my visual indicator cap on a pedestal adjacent a utility pole;

FIG. 3 is a sectional view along line 3—3 of FIG. 1;

FIG. 4 is a plan view of the visual indicator cap; and

FIG. 5 is an elevational view of the cap from line 5—5 of FIG. 4.

DESCRIPTION OF THE PREFERRED EMBODIMENT

Referring now to the drawings for a better understanding of the invention, FIG. 1 shows an upstanding telecommunication terminal pedestal 11 of the type commonly used by telephone companies, that is, a 12" by 12" green-colored pedestal. The pedestal has affixed thereto a cover 12 having an out-turned contoured watershed lip 13. Affixed to the cover and engaging the lip 13 is my visual indicator cap 14. The cap 14 is substantially square and has a peaked cover portion 16 which slopes downwardly from the center thereof and is integrally formed with depending sidewalls 17 and rounded corners, with each sidewall 17 having a depending latch member 18 which engages the lip 13.

The sidewalls 17 fit snugly about the cover 12. The latch members 18 have a flexible first portion 19 which extends downwardly and slightly outwardly from the sidewall 17, a semi-rigid second portion 21 extending downwardly and inwardly perpendicular to the first portion 19 and a semi-rigid third portion 22 extending upwardly and inwardly substantially parallel to the first portion 19, thus forming a groove 23 within which the lip 13 is received.

The snug fit of the sidewalls 17 with the cover 12 allows for thermodynamic action between the dissimilar materials. That is to say, there is relative movement between the cap 14 and cover 12 during temperature changes but not enough to allow the cap to be removed by disengagement of the latch members 18.

As may be seen in FIG. 2, the pedestal 11 is sometimes located adjacent a utility pole 24 or other structure and top access cables are installed through a port in the cover 12. To facilitate the use of my cap 14 in such installations, the cover portion has a removable portion 27 scored into the plastic proximal one of the latch members 18 so that the installing technician may easily remove the material necessary to provide a passage for the cables. He may also remove any portion of or all of the adjacent latch to permit fitting the cap onto the cover 12. The latch 18 preferably has a length of engagement along the lip 13 which is sufficient to allow removal of a segment thereof, while leaving enough of the latch to attach to the lip 13. If the entire latch 18 must be removed, the remaining latches 18 will be sufficient to secure the cap 14 to the cover 13.

The color of the cap is formulated to retain its immediate recognition characteristics over a period of at least five years by utilizing a composition including ultraviolet absorbers such as Ciba Geigy's Chemisorb 944, TinuVin 770 or 327. Preferably the color is Telecommunication Orange or OSHA's International Red-Orange. It is also desirable that the cover have reflective or luminescent characteristics as well, which may be included in a manner well known in the plastic arts.

While I have shown my invention in one form, it will be obvious to those skilled in the art that it is not so limited but is susceptible of various changes and modifications without departing from the spirit thereof.

What I claim is:

1. A visual indicator cap for telecommunication cable terminal pedestals having a watershed cover comprising:

(a) a substantially square cover portion having depending sidewalls and rounded corners, said cover portion being conformable to the shape of said watershed cover;

(b) a latch member depending from each sidewall of said cover portion with each latch member having an inwardly facing groove-like portion for engaging the edge of said watershed cover; and (c) a scored removable portion proximal one of said latch members cooperatively positioned for passage of telecommunictions cables from said pedestal therethrough.

2. The visual indicator cap as defined in claim 1 wherein said cap is made from plastic having light reactive composition to enhance its durability.

3. The visual indicator cap as defined in claim 1 wherein said cap is made from plastic and each latch member has a flexible downwardly and outwardly extending first portion, a semi-rigid second portion extending inwardly at approximately a right angle to said first portion, and a semi-rigid third portion extending upwardly and inwardly approximately parallel to said first portion such that said inwardly facing groove-like portion is formed between said first and third portions.

4. The visual indicator cap as defined in claim 3 wherein said cover portion is peaked at the center thereof and slopes downwardly and outwardly toward said sidewalls.

5. The visual indicator cap as defined in claim 4 wherein said cover portion is colored for immediate recognition visibility and includes ultraviolet absorbers to enhance durability.

* * * * *